United States Patent [19]
Denz et al.

[11] Patent Number: 5,056,484
[45] Date of Patent: Oct. 15, 1991

[54] REGULATING DEVICE FOR ADJUSTING A REGULATING MEMBER

[75] Inventors: Helmut Denz, Stuttgart; Ernst Wild, Oberriexingen, both of Fed. Rep. of Germany

[73] Assignees: Robert Bosch GmbH, Stuttgart, Fed. Rep. of Germany; Robert Bosch GmbH, Stuttgart, Fed. Rep. of Germany

[21] Appl. No.: 478,321

[22] Filed: Feb. 12, 1990

[30] Foreign Application Priority Data

Feb. 15, 1989 [DE] Fed. Rep. of Germany ....... 3904478

[51] Int. Cl.[5] ........................ F02D 9/02; F02D 41/22; G05G 5/12; H01F 7/14

[52] U.S. Cl. .................................... 123/399; 123/585

[58] Field of Search ............... 123/399, 339, 361, 479, 123/585; 251/129.04, 129.05, 129.11

[56] References Cited

U.S. PATENT DOCUMENTS

| | | | |
|---|---|---|---|
| 4,426,988 | 1/1984 | Greiner et al. | 123/585 |
| 4,494,517 | 1/1985 | Kratt et al. | 123/585 |
| 4,724,811 | 2/1988 | Maisch | 123/399 |
| 4,735,183 | 4/1988 | Inoue et al. | 123/399 |
| 4,785,782 | 11/1988 | Tanaka et al. | 123/399 |
| 4,856,477 | 8/1989 | Hanaoka et al. | 123/399 |
| 4,909,213 | 3/1990 | Mezger et al. | 123/399 |

FOREIGN PATENT DOCUMENTS

| | | |
|---|---|---|
| 2872292 | 10/1979 | Fed. Rep. of Germany . |
| 3743309 | 6/1989 | Fed. Rep. of Germany . |
| 1602507 | 11/1981 | United Kingdom . |

*Primary Examiner*—Tony M. Argenbright
*Assistant Examiner*—Robert E. Mates
*Attorney, Agent, or Firm*—Edwin E. Greigg; Ronald E. Greigg; Edwin E. Greigg

[57] ABSTRACT

A regulating device for rotary adjustment of a regulating member comprises a regulatable electrical control drive connected to the regulating member and a restoring device which acts on the regulating member or on the control drive and which returns the regulating member to a starting position in which, for example, the emergency operation of an internal combustion engine is ensured optimum operation of the regulating member without constant reference to the emergency situation, a release device is provided which is only effective during undisturbed normal operation of the control device and which produces a counterforce compensating for the restoring force of the restoring device.

17 Claims, 3 Drawing Sheets

REGULATING MEMBER 10
12
CONTROL DRIVE 11
ELECTRONIC CONTROL DEVICE 18
RESTORING DEVICE 21
RELEASE DEVICE 22

REGULATING DEVICE FOR ADJUSTING A REGULATING MEMBER

BACKGROUND OF THE INVENTION

The invention relates to a regulating device for adjusting a regulating member, more particularly, to a rotary regulator for regulating the angle of rotation of a throttle member that determines a passage cross-section in a flow line of an internal combustion engine.

Examples of these regulating devices are used a so-called idle regulators in control systems of internal combustion engines in which, for example, a throttle member is mounted in a by-pass line associated with the internal combustion engine intake pipe; said throttle member, in turn, determines a mean cross-section of the by-pass line. Idle regulators of the said type are designed as so-called single winding regulators (SWR) or double winding regulators (DWR). An example of SWR is described in German patent 37 43 309 A1 and an example of a DWR is described in German patent 28 12 292 C2.

In the case of the aforementioned regulators, when problems occur in the control system, the throttle member adopts an emergency position in which overspeeding of the engine is prevented as a result of a predetermined passage cross-section of the by-pass line and continued operation of the internal combustion engine is ensured in a so-called emergency mode. In this emergency position of the throttle member, the passage cross-section of the by-pass line is generally only open ¼ to ½ of the maximum passage cross-section. The throttle member or restoring member is moved into its emergency or starting position which is essential to the safe operation of the engine by the restoring device.

In a known regulating device of the above-described type (German patent 32 00 096 A1) the restoring device comprises a spiral spring which permanently influences the drive and thus directly acts on the regulating member. The restoring force of the spring is substantially less than the restoring force of the control drive and accordingly, during normal uninterrupted operation of the control drive the regulating member can be regulated by the control drive in opposition to the restoring force of the spring. However, when the restoring force of the control drive is removed, for example, as a result of an interruption in the power supply, the spring moves the regulating member into the emergency position.

To ensure reliable operation it is necessary for the spring to be relatively powerful in order that the emergency cross-section obtained when the regulating member is in the emergency position is reliably ensured. Accordingly, the electrical control drive must be provided with a relatively large output winding. As a result, the cross-sectional area of passage opened by the regulating member is dependent on the battery voltage and the external temperature. For example, when the battery voltage is low or the outside temperature is very low it is not possible to obtain the maximum opening cross-section in the by-pass line. Furthermore, the restoring device comes into operation when the electrical control, function of the control drive fails but not when there is a short circuit. When a short circuit occurs the regulating member fully opens the cross-sectional area of passage. The internal combustion engine is suddenly accelerated and runs at high speeds.

OBJECT AND SUMMARY OF THE INVENTION

An advantage of the regulating device is that during uninterrupted normal operation of the regulating device the restoring device is not operative and, accordingly does not influence the control drive or the regulating member. Accordingly, the operation of the control drive can depend solely on the criteria of normal operation without consideration for emergency operation. For example, the output windings can be relatively small, thereby resulting in a reduction in the influence of battery voltage and external temperature.

If, in a preferred embodiment of the invention the restoring force of the restoring device is greater than the restoring force produced by the control drive at maximum current, the regulating member is returned to its starting position not only during interruptions resulting from breakdown of the electrical output of the output winding of the regulating device but also during interruptions resulting from short-circuiting of the output winding.

In another embodiment of the invention detection of normal operation and emergency operation of the control drive is effected by means of a detection circuit which, when the control drive is energized in the usual manner by means of d.c. pulses of constant frequency and variable keying ratio, generates a starting signal for the release device from the voltage peaks produced in the control drive. Inductive voltage peaks are produced in the output winding of the control drive at the end of each control pulse. These inductive voltage peaks are used, for example, to charge a capacitor. Upon reaching a switching threshold, a current gate is opened and the release device is engaged. If these voltage peaks of the correct frequency are missing, either because the d.c. pulses are not present or as a result of a constant flow of current through the output winding resulting from a ground, the capacitor will not be adequately charged, the release device will not operate and the restoring device returns the regulating member to its emergency or starting position.

In a preferred embodiment of the invention the release device comprises a release winding, an armature which cooperates electromagnetically with the latter and an electronic switch connecting the release winding to a d.c. voltage. The control input of the electronic switch is connected to the detection circuit and the armature is mechanically connected to the restoring device. When current is flowing to the release winding the magnetic force acting on the armature is greater than the restoring force of the restoring device and is oppositely directed with respect to the latter.

The restoring device can have different configurations. Preferably, it pushes the regulating member or control drive into its respective starting position. The armature which exerts an attracting influence when the release device is excited raises the restoring device from the regulating member or control drive and the restoring spring is simultaneously stressed.

BRIEF DESCRIPTION OF THE DRAWING

The invention will be described in greater detail hereinafter referring to the embodiments shown in the drawings.

DESCRIPTION OF THE PREFERRED EMBODIMENT

Figure 1:
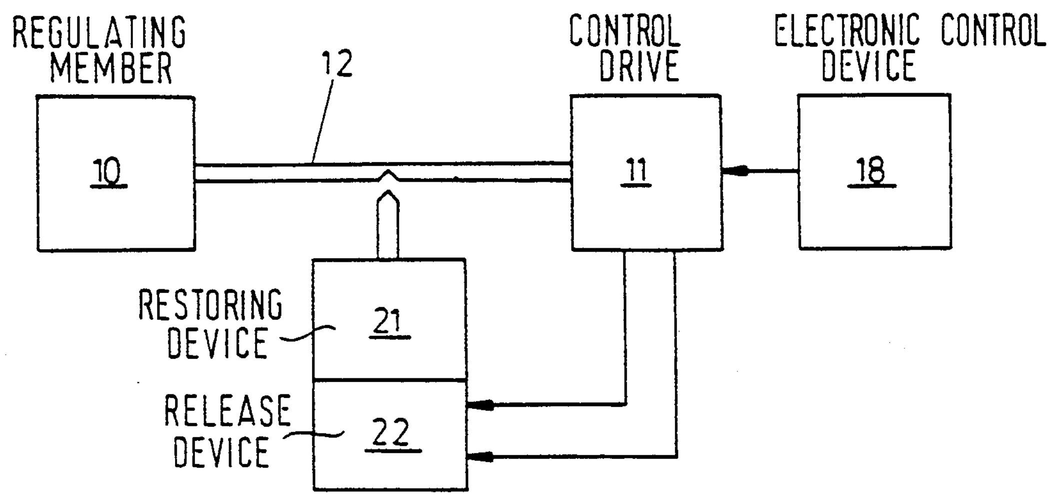
FIG. 1 is a schematic drawing of a regulating device for regulating a regulating member.
Figure 2:
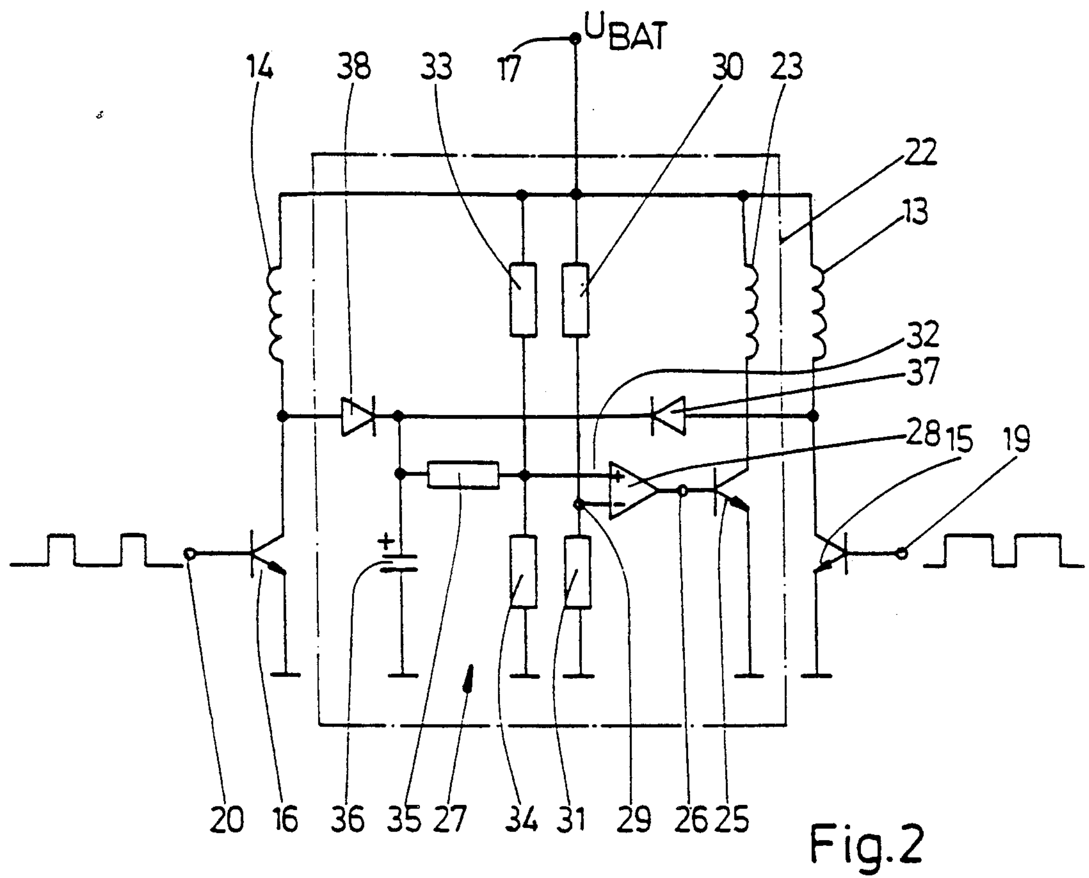
FIG. 2 is a wiring diagram of an electrical part of a control drive and release device in the regulating device in FIG. 1.
Figure 3:
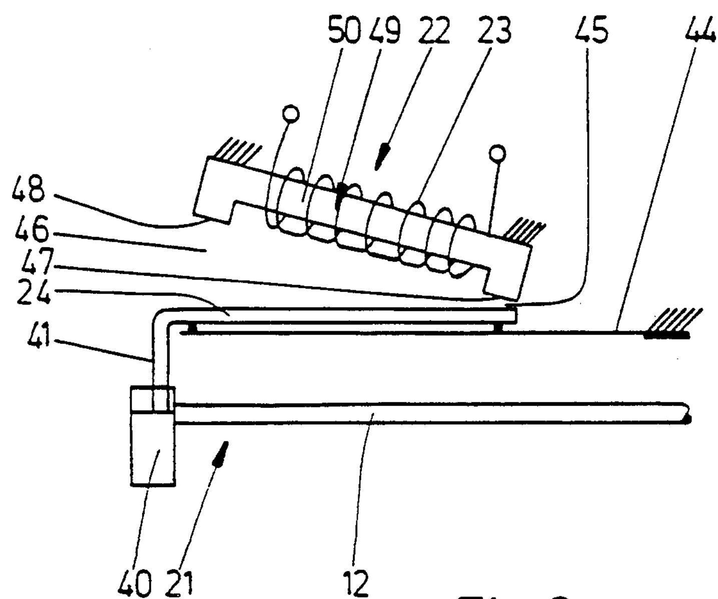
FIGS. 3 and 4 are each schematic diagrams of the mechanical part of the release device and of a resorting device in the regulating device shown as side views and in an emergency mode (FIG. 3) and uninterrupted normal operation (FIG. 4)

The regulating device for regulating a regulating member 10 shown in the block schematic in FIG. 1 may be a single winding rotary regulator, a two winding regulator, a stroke regulator, a throttle valve regulator or similar device for an internal combustion engine. The regulating member 10 may, for example, be a throttle in by-pass line. Rotary regulating devices of this type are described, for example, in German patent 37 43 309 A1, German patent 28 12 292 C2 or German disclosure document 32 00 096. The regulating device comprises a control drive 11 which is coupled to the regulating member 10 via a shaft 12. The control drive is generally a servomotor, for example, a two-phase synchronous motor as described in German patent 28 12 292 C2 or German patent 32 00 096 A1. The servomotor comprises two windings 13, 14 which are offset about 90° and oppositely effective (FIG. 2). The windings 13, 14 are each in series with a control transistor 15, 16 respectively, and are connected to a d.c. voltage drawn from the battery of the vehicle. The two control transistors 15, 16 are controlled by an electronic control device 18 with d.c. pulses at a constant pulse repetition rate and variable timing relationship such that the servomotor rotor which generally consists of two segmental permanent magnets assumes a rotational adjustment corresponding to the timing relationship. The control transistors 15, 16 are started in a complimentary manner, i.e., simultaneously with inverse inputs 19, 20 or the two control transistors 15, 16.

Figure 7:
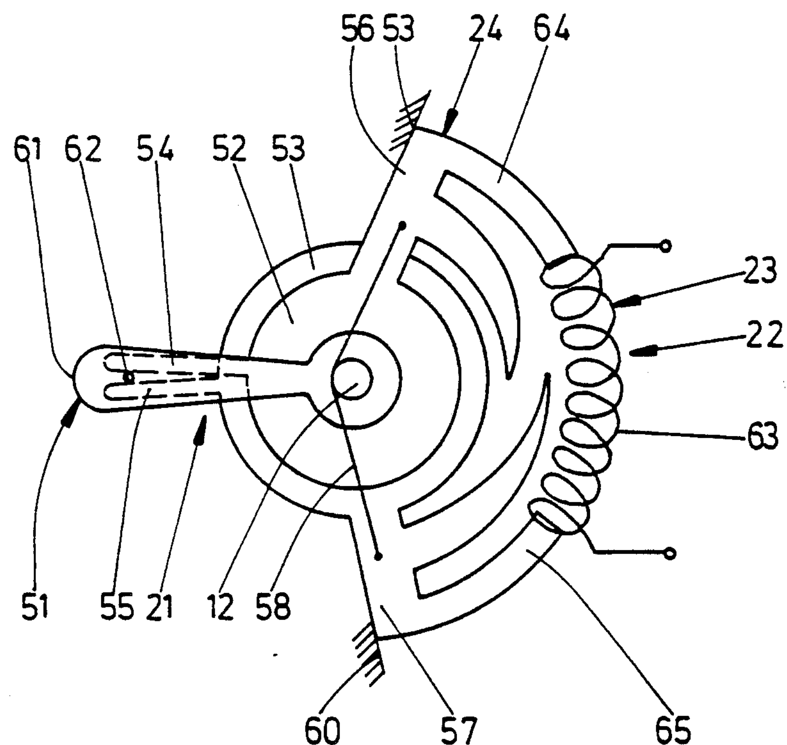
FIGS. 7 and 8 are each diagrammatic views of the mechanical part of the release device and of the restoring device in the regulating device shown in FIG. 1 but according to a different embodiment in plan view and during emergency operation (FIG. 7) and normal operation (FIG. 8).
Figure 8:
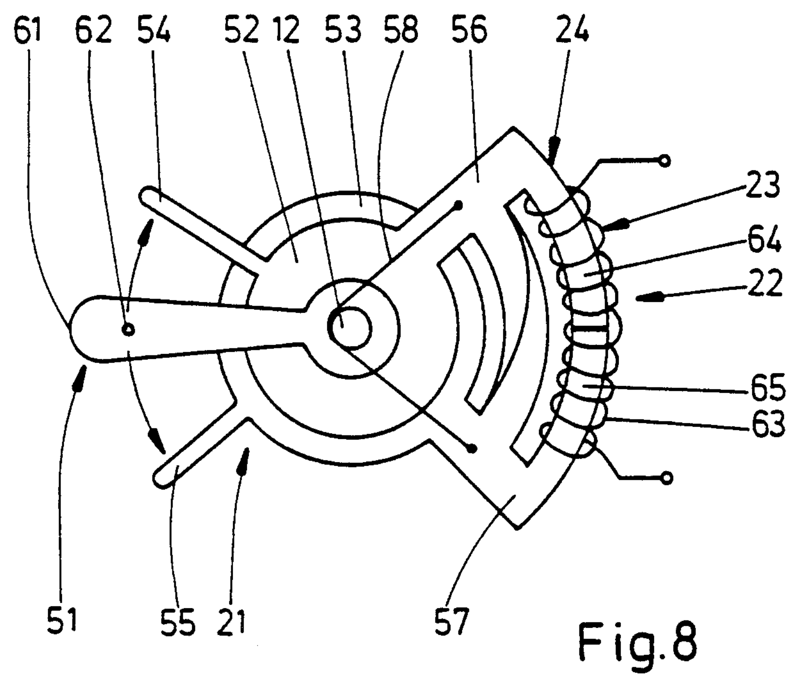

The shaft 12 is mechanically influenced by a restoring device 21 which is designed to move the regulating member 10 into a starting or emergency position in which a rigidly predetermined cross-sectional area of passage is formed in the by-pass line; said cross-sectional area of passage corresponding, for example to $\frac{1}{4}$ to $\frac{1}{2}$ of the maximum cross-sectional area of passage. A release device 22 is coupled to the restoring device 21. The release device 22 is such that during undisturbed normal operation of the control drive 11, it produces a counterforce which compensates the restoring force of the restoring device 21 influencing the shaft 12. A first embodiment of the restoring device 21 and of the mechanical part of the release device 22 is shown in FIGS. 3–6 and a second embodiment is shown in FIGS. 7 and 8. In both cases the release device 22 comprises a release winding 23 and an armature 24 electromagnetically cooperating with the latter. The armature 24 is mechanically coupled to the restoring device 21. The magnetic force exerted on the armature 24 when current flows through the winding 23 is designed to be greater than the restoring force of the restoring device 21 and is oppositely directed with respect to the latter.

As shown in FIG. 2, the release winding 23 is connected in series with a transistor 25 to a d.c. voltage, as represented by the vehicle battery 17. The control input 26 of the transistor 25 is connected to a detection circuit 27 as part of the release device 22. The detection circuit 27 detects the voltage peaks produced in the windings 13, 14 during normal operation of the regulating device and generates a control signal to the transistor 25 by way of a starting signal for the release device 22. As a result the transistor becomes conductive and current flows to the release device 23. The release device 23 attracts the armature 24 whereupon the restoring device 21 is disengaged from the shaft 12. As a result, the shaft 12 is freed to rotate the regulating member 10 by waY of the drive 11.

More specifically, the detection circuit 27 comprises a comparator 28 whose reference input 29 is occupied by a reference voltage tapped from a voltage divider. The voltage divider is formed by the resistors 30, 31. The divider is connected to the d.c. supply voltage U 17. The other input 32 is provided on the voltage tap of a voltage divider which is formed by the resistors 33 and 34 and which is also connected to the battery; the voltage tap again being connected via a resistor 35 to the positive plate of a capacitor 36. The capacitor 36 is connected, on the one hand, in series with a first diode 37 parallel to the control transistor 15 and, on the other hand, via a second diode 38 parallel to the control transistor 16. The resistors 30, 31, 33–35 are tuned in such a way that when the control transistors 15, 16 are opened, the capacitor 36 is supplied via the voltage peaks induced in the windings 13, 14 with a voltage which is greater than the reference voltage at the reference input 29 of the comparator 28. If these voltage peaks are not present, for example, as a result of a lack of control pulses at the control inputs 19, 20 of the control transistors 15, 16 or as a result of a ground leakage of the windings 13, 14, the capacitor 36 will only be charged to a voltage which is less than the reference voltage at the comparator 28. As soon as the voltage at the input 32 of the comparator 28 exceeds the reference voltage at the reference input 29 the transistor 25 receives a control signal and closes. The release device 23 is excited in the aforementioned manner and attracts the armature 24.

Figure 5:
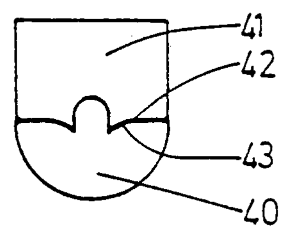
FIGS. 5 and 6 each show front views of the restoring device shown in FIGS. 3 and 4.
Figure 4:
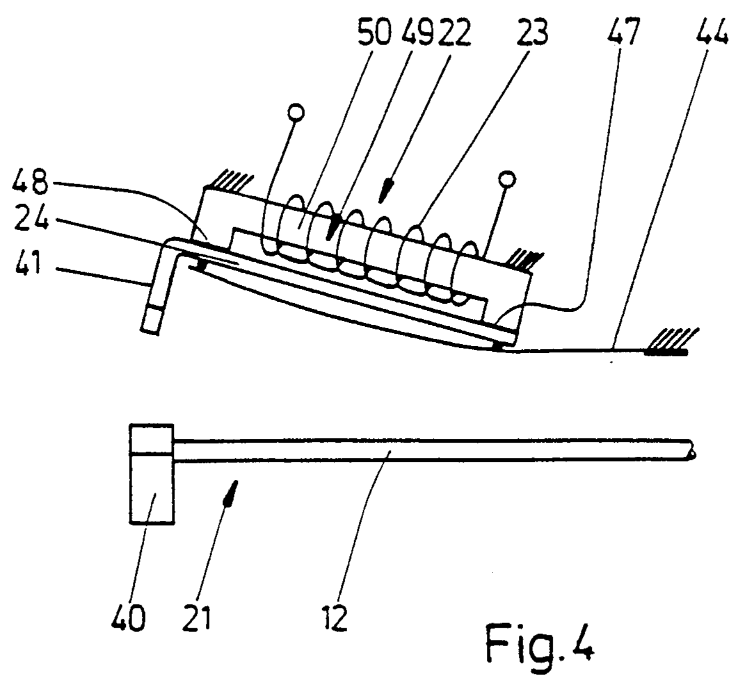
Figure 6:
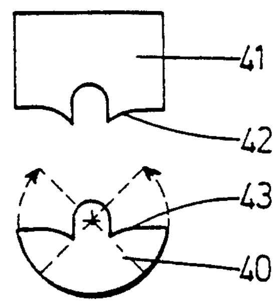

In the embodiment of the restoring device 21 shown in FIGS. 3–6 the restoring device 21 comprises a contour disk 40 and a contour segment 41 which are each provided with mutually corresponding contour lines 42 or 43. The contour disk 40 and contour segment 41 are shown in FIGS. 5 and 6. The contour lines 42, 43 are such that, independent of a rotational position of the contour disk 40, when the contour line 42 is pressed onto the contour line 43, the contour disk 40 turns in such a way that ultimately the two contour lines 42, 43 are adjacent to one another in a form-locking manner as shown in FIG. 5. The contour disk 40 is rigidly connected to the shaft 12 such that in the reference rotational position of the contour disk 40 shown in FIG. 5, the regulating member 10 which is rigidly mounted on the shaft 12 adopts its emergency of starting position in which the so-called emergency cross-section is obtained in the by-pass line. The contour segment 41 is attached to the free end of a leaf spring 44 which is clamped on one side and it is pressed onto the contour disk 40 by the spring 44. The spring force of the leaf spring 44 is greater than the friction forces produced at the regulating member 10, the control drive 11, at the shaft 12 and the contour lines 42, 43, thereby reliably ensuring that the contour disk 40 is moved from a random rotational position to the starting position shown in FIG. 5. The armature 24 of the release device 22 is attached to the contour segment 41, and the leaf spring 44 and is disposed opposite the front flank faces 47 or 48 of a U-shaped magnetic core 49 made of ferromagnetic material with useful air spaces 46 or 46 left therebetween. The release device 23 encloses the yoke 50 of the magnetic core 49 connecting the flanks.

If the release device 23 is excited the armature 24 rests against the front flank faces 47, 48 and raises the contour segment 41 from the contour disk 40. The shaft 12 is now released and the regulating member 10 can be rotated by the control drive 11 according to its control signal. The perforated lines in FIG. 6 show two possible positions of the contour disk 40 which rotates simultaneously with the shaft 12. When the starting pulses are not present at the transistors 15, 16 the energization of the transistor 25 is eliminated and the current flow in the release winding 23 is interrupted. The armature 24 moves away and the leaf spring 44 presses the contour segment 41 onto the contour disk 40. The shaft 12 and thus the regulating member 10 and the control drive 11 are moved via the contour disk 40 into the starting position shown in FIG. 5. The regulating member 10 is in its emergency position.

The restoring device 21 shown in FIGS. 7 and 8 comprises a cam 51 fixedly connected to the shaft 12 for rotation therewith and two rotary disks 52, 53 that are rotatably mounted on the shaft 12. The rotary disks 52, 53 each comprises a radially projecting extension piece 54 or 55 and a radially projecting detent piece 56 or 57. Mounted on the shaft 12 is a flank spring 58 which rests on and engages each disk 52, 53 via its flanks. The flanks spring 58 forces the rotary disks 52, 53 via their detent pieces 56, 57 against fixed stops 59, 60. In this position the extension pieces 54, 55 possessing opposite force directions have come to rest from both sides on the cam 51 and have moved the latter while rotating the shaft 12 into a position in which the regulating member 10 The cam 51 consists of a cam plate 61 which is fixedly mounted on the shaft 12 and extends in a radial direction from the shaft 12 and of a cam pin 62 projecting at right angles from the cam plate 61 and extending parallel to the shaft 12. The cam pin 62 projects into the path of the extension pieces 54, 55 on the rotary disks 52, 53 such that the cam plate 61 and thus the shaft 12 can be rotated via the pin 62 by the rotary disks 52, 53.

The release device 22 again comprises the release winding 23 and the armature 24 cooperating with the same. The release winding 23 comprises a curved cylindrical coil 63. The armature 24 comprises two curved plunger pieces 64, 65 which project into the cylindrical coil 63 on both front sides of the same. A plunger piece 64 or 65 is connected as one piece to each detent piece 56 or 57 on the rotary disk 52 or 53. If the cylindrical coil 63 is excited the plunger pieces 64, 65 are drawn into the cylindrical coil 63. As a result, the rotary disks 52, 53 are rotated while stressing the flank spring 58, whereupon the extension pieces 54, 55 are raised from the cam pin 62 and the latter is able to rotate freely (FIG. 8). As a result, the shaft 1 2 is also released and the control drive 11 ca adjust the regulating member 10 according to its input information.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A regulating device for adjusting a rotary regulator for regulating an angle of rotation of a throttle member for determining a cross-sectional passage area in a flow line of an internal combustion engine, comprising a regulating member in said flow line, a regulatable, electrical control drive connected to the regulating member, a restoring device which acts upon the regulating member as well as said control drive and returns the regulating member to a position that ensures a predetermined cross-sectional passage area in the flow line, an electromagnetically operated release device (22) which is only effective during uninterrupted normal operation of the control drive (11) and which produces a counterforce compensating for a restoring force of the restoring device (21).

2. A regulating device as claimed in claim 1, in which the restoring force of the restoring device (21) is greater than a regulating force of the control drive (11).

3. A regulating device as claimed in claim 2 wherein the control drive is controlled by direct current pulses, and said release device (22) comprises a detection circuit (27) which generates a control signal that activates the release device (22) due to voltage peaks produced in the control drive (11) during normal operation.

4. A regulating device as claimed in claim 3, in which said release device (22) comprises a release winding (23), an armature (24) which is connected to the restoring device (21) and which cooperates electromagnetically with the winding (23), and a first electronic switch (25) connecting the winding (25) to a direct current voltage supply (17), a control input (26) of said first electronic switch (25) being connected to the detection circuit (27), and when current is supplied to the winding (23) a magnetic force acting on the armature (24) is greater than the restoring force of the restoring device (21) and is oppositely directed thereto.

5. A regulating device as claimed in claim 4, wherein the restoring device (21) comprises a contour disk (40) attached to a shaft (12) that connects the regulating member (10) and control drive (11), a spring that produces a spring force, and a contour piece (41) which cooperates with the contour disk (40) and which is pressed by said spring force onto the contour disk (40), said contour disk and said contour piece include contour lines (42, 43) that mesh during a pressing action of said spring such that the contour disk (40) is rotated under spring force into an end position in which the contour lines (42, 43) rest against one another in a form-locking manner and wherein the contour disk (40) is mounted on the shaft (12) in such a way that the regulating member (10) adapts its starting position in an end position of the contour disk (40) and wherein the contour piece (41) is connected to the armature (24) of the release device (22).

6. A regulating device as claimed in claim 5, in which said contour piece (41) and armature (24) are formed in one integral piece and are attached to a leaf spring (44) which is clamped on one side, and the armature (24) is disposed opposite front flank faces (47, 48) of a U-shaped magnetic core (49) enclosed by the release winding (23) with useful air gaps (45, 46) left therebetween.

7. A regulating device as claimed in claim 4, in which said restoring device (21) comprises a cam (51) fixedly mounted on the shaft (12) and rotatably therewith, said shaft connects a regulating member (10) and control drive (11) and two rotary disks (52, 53) rotatably mounted on said shaft (12) and each rotary disk includes a radial extension piece (54, 55); a restoring spring (58) is supported between said disks (52, 53) such that the extension pieces (54, 55) have opposite force directions and rest against said cam (51) and are connected to the shaft (12) in such a way that in an end position, the regulating member (10) is in its starting position, and said armature (24) of the release device (22) comprises two curved plunger segments (64, 65) which project on front sides thereof into the release winding (23) formed of a curved cylindrical coil (63) and which are each rigidly connected to one of the two rotary disks (52, 53).

8. A regulating device as claimed in claim 7, in which said restoring spring comprises a leg spring (580) which is rotatably mounted on the shaft (12) and which influences at least one of the rotary disks (52, 53) with a leg.

9. A regulating device as claimed in claim 7, in which said cam (51) comprises a cam plate (61) which is rigidly connected to the shaft (12) and projects radially therefrom and a cam pin (62) is attached to the cam plate (61) extending at right angles thereto and parallel to the shaft (12); said pin (62) forms a stop for the extension pieces (54, 55) of the rotary disks (52, 53).

10. A regulating device as claimed in claim 8, in which said cam (51) comprises a cam plate (61) which is rigidly connected to the shaft (12) and projects radially therefrom and a cam pin (62) is attached to the cam plate (61) extending at right angles thereto and parallel to the shaft (12); said pin (62) forms a stop for the extension pieces (54, 55) of the rotary disks (52, 53).

11. A regulating device as claimed in claim 4, in which said control drive comprises two operating windings (13, 14) designed to be connected alternately via a second and third electronic switch (15, 16) to a direct current voltage, and the release winding (23) is connected in series with said first electronic switch (25) connected to the direct current voltage (17), and a control input (26) of said first electronic switch (25) is connected to an output of a comparator (28) which includes a reference input (29) and a second input (32), said reference input (29) is supplied with a reference voltage and said second input (32) is connected via a resistor (35) to a capacitor (36) which is connected via diodes (38, 37) to said two windings (13, 14) of the control drive (11) in such a way that said capacitor (36) is charged by inductive voltage peaks produced in the windings (13, 14) when the second and third electronic switches (15, 16) are blocked.

12. A regulating device as claimed in claim 5, in which said control drive comprises two operating windings (13, 14) designed to be connected alternately via a second and third electronic switch (15, 16) to a direct current voltage, and the release winding (23) is connected in series with said first electronic switch (25) connected to the direct current voltage (17), and a control input (26) of said first electronic switch (25) is connected to an output of a comparator (28) which includes a reference input (29) and a second input (32), said reference input (29) is supplied with a reference voltage and said second input (32) is connected via a resistor (35) to a capacitor (36) which is connected via diodes (38, 37) to said two windings (13, 14) of the control drive (11) in such a way that said capacitor (36) is charged by inductive voltage peaks produced in the windings (13, 14) when the second and third electronic switches (15, 16) are blocked.

13. A regulating device as claimed in claim 6, in which said control drive comprises two operating windings (13, 14) designed to be connected alternately via a second and third electronic switch (15, 16) to a direct current voltage, and the release winding (23) is connected in series with said first electronic switch (25) connected to the direct current voltage (17), and a control input (26) of said first electronic switch (25) is connected to an output of a comparator (28) which includes a reference input (29) and a second input (32), said reference input (29) is supplied with a reference voltage and said second input (32) is connected via a resistor (35) to a capacitor (36) which is connected via diodes (38, 37) to said two windings (13, 14) of the control drive (11) in such a way that said capacitor (36) is charged by inductive voltage peaks produced in the windings (13, 14) when the second and third electronic switches (15, 16) are blocked.

14. A regulating device as claimed in claim 7, in which said control drive comprises two operating windings (13, 14) designed to be connected alternately via a second and third electronic switch (15, 16) to a direct current voltage, and the release winding (23) is connected in series with said first electronic switch (25) connected to the direct current voltage (17), and a control input (26) of said first electronic switch (25) is connected to an output of a comparator (28) which includes a reference input (29) and a second input (32), said reference input (29) is supplied with a reference voltage and said second input (32) is connected via a resistor (35) to a capacitor (36) which is connected via diodes (38, 37) to said two windings (13, 14) of the control drive (11) in such a way that said capacitor (36) is charged by inductive voltage peaks produced in the windings (13, 14) when the second and third electronic switches (15, 16) are blocked.

15. A regulating device as claimed in claim 8, in which said control drive comprises two operating windings (13, 14) designed to be connected alternately via a second and third electronic switch (15, 16) to a direct current voltage, and the release winding (23) is connected in series with said first electronic switch (25) connected to the direct current voltage (17), and a control input (26) of said first electronic switch (25) is connected to an output of a comparator (28) which includes a reference input (29) and a second input (32), said reference input (29) is supplied with a reference voltage and said second input (32) is connected via a resistor (35) to a capacitor (36) which is connected via diodes (38, 37) to said two windings (13, 14) of the control drive (11) in such a way that said capacitor is charged by inductive voltage peaks produced in the windings (13, 14) when the second and third electronic switches (15, 16) are blocked.

16. A regulating device as claimed in claim 9, in which said control drive comprises two operating windings (13, 14) designed to be connected alternately via a second and third electronic switch (15, 16) to a direct current voltage, and the release winding (23) is connected in series with said first electronic switch (25) connected to the direct current voltage (17), and a control input (26) of said first electronic switch (25) is connected to an output of a comparator (28) which includes a reference input (29) and a second input (32), said reference input (29) is supplied with a reference voltage and said second input (32) is connected via a resistor (35) to a capacitor (36) which is connected via diodes (38, 37) to said two windings (13, 14) of the control drive (11) in such a way that said capacitor (36) is charged by inductive voltage peaks produced in the windings (13, 14) when the second and third electronic switches (15, 16) are blocked.

17. A regulating device as claimed in claim 10, in which said control drive comprises two operating windings (13, 14) designed to be connected alternately via a second and third electronic switch (15, 16) to a direct current voltage, and the release winding (23) is connected in series with said first electronic switch (25) connected to the direct current voltage (17), and a control input (26) of said first electronic switch (25) is connected to an output of a comparator (28) which includes a reference input (29) and a second input (32), said reference input (29) is supplied with a reference voltage and said second input (32) is connected via a resistor (35) to a capacitor (36) which is connected via diodes (38, 37) to said two windings (13, 14) of the control drive (11) in such a way that said capacitor (36) is charged by inductive voltage peaks produced in the windings (13, 14) when the second and third electronic switches (15, 16) are blocked.

* * * * *